(12) United States Patent    (10) Patent No.:   US 12,674,886 B1

Haydon      (45) Date of Patent:    Jul. 7, 2026

(54) SYSTEM AND METHOD FOR NAVIGATIONAL DETERMINATION USING RANGE-DOPPLER RADAR ALTIMETRY

(71) Applicant: National Technology & Engineering Solutions of Sandia, LLC, Albuquerque, NM (US)

(72) Inventor: Tucker Caelen Ellis Haydon, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 295 days.

(21) Appl. No.: 18/370,624

(22) Filed: Sep. 20, 2023

Related U.S. Application Data

(60) Provisional application No. 63/410,276, filed on Sep. 27, 2022.

(51) Int. Cl.
| | |
|---|---|
| *G01S 13/93* | (2020.01) |
| *G01S 13/60* | (2006.01) |
| *G01S 13/86* | (2006.01) |
| *G01S 13/935* | (2020.01) |

(52) U.S. Cl.
CPC ............ *G01S 13/935* (2020.01); *G01S 13/60* (2013.01); *G01S 13/86* (2013.01)

(58) Field of Classification Search
CPC ......... G01S 13/935; G01S 13/60; G01S 13/86
USPC ....................................................... 342/107
See application file for complete search history.

(56) References Cited

U.S. PATENT DOCUMENTS

| | | | |
|---|---|---|---|
| 7,218,268 B2 | 5/2007 | Vandenberg | |
| 7,859,449 B1 | 12/2010 | Woodell et al. | |
| 8,633,913 B1 | 1/2014 | Raghu et al. | |
| 8,788,128 B1 * | 7/2014 | McCusker | G05D 1/0676 |
| | | | 701/4 |
| 8,907,817 B1 | 12/2014 | Finley et al. | |
| 9,024,805 B1 | 5/2015 | Jinkins et al. | |
| 9,110,170 B1 * | 8/2015 | Woollard | G01S 13/89 |
| 9,304,198 B1 * | 4/2016 | Doerry | G01S 5/16 |
| 2010/0125381 A1 | 5/2010 | Botargues et al. | |
| 2013/0009808 A1 * | 1/2013 | Hering | G01S 13/953 |
| | | | 342/26 B |
| 2013/0147666 A1 | 6/2013 | Abe et al. | |
| 2016/0223665 A1 * | 8/2016 | Winstead | G01S 13/882 |

* cited by examiner

*Primary Examiner* — Samarina Makhdoom

(74) *Attorney, Agent, or Firm* — Merle W. Richman

(57) ABSTRACT

The technologies described herein relate to computing position of an aircraft, such as latitude/longitude coordinates, based upon range and Doppler measurements generated by a range-Doppler radar sensor system. The range-Doppler radar system irradiates an area below an airborne aircraft with radar signals and detects return signals that have reflected from a surface of the earth. The range-Doppler radar system generates range and Doppler measurements based upon the detected return signals. Range measurements are assigned to Doppler bins based upon the Doppler measurements that correspond to the range measurements, and range measurements are selected from the Doppler bins based upon the values of the range measurements. The selected range measurements are employed to identify positions on a digital terrain map that represents the surface of an environment. The position of the aircraft is computed based upon the identified positions on the digital terrain map.

20 Claims, 13 Drawing Sheets

202 START

204 EMIT RADAR SIGNALS INTO ENVIRONMENT

206 RECEIVE ECHO REFLECTIONS FROM THE SURFACE OF THE ENVIRONMENT

208 GENERATE RANGE AND DOPPLER MEASUREMENTS

210 END

300

SYSTEM AND METHOD FOR NAVIGATIONAL DETERMINATION USING RANGE-DOPPLER RADAR ALTIMETRY

CROSS-REFERENCE TO RELATED APPLICATIONS

This application claims priority to provisional patent application U.S. Ser. No. 63/410,276, entitled "SYSTEM AND METHOD FOR NAVIGATIONAL DETERMINATION USING RANGE-DOPPLER RADAR ALTIMETRY", filed Sep. 27, 2022, the disclosure of which is incorporated herein by reference in its entirety.

STATEMENT OF GOVERNMENTAL INTEREST

This invention was made with Government support under Contract No. DE-NA0003525 awarded by the United States Department of Energy/National Nuclear Security Administration. The U.S. Government has certain rights in the invention.

BACKGROUND

In connection with navigating an environment, an object in flight, such as an aircraft, may approximately determine its position in the environment based upon sensor signals generated by sensor systems of the aircraft. For example, the aircraft may include sensors, such as an inertial measurement unit (IMU), global positioning service (GPS) receiver, and/or an altimeter, wherein output of the sensors can be employed to estimate position (e.g., latitude/longitude coordinates), altitude, velocity, acceleration, attitude, and other navigational states of the aircraft. However, in certain environments, satellite signals may not be available and the object in flight may not be able to determine its location in space (flight) via satellite or other wireless signals.

Radar sensor systems have been coupled to aircrafts and, for predefined time intervals, may emit radar signals into a surrounding environment. The emitted radar sensor signals may reflect off surfaces in the environment and the radar sensor system may then detect the reflected radar signals. Conventionally, a radar sensor system may be configured to compute a range between the aircraft and a point on the surface of the earth that is directly beneath the aircraft. In some environments, a radar sensor system may experience interference with communications transmitted by way of certain frequencies, such as 5G broadband cellular communication frequencies, which may negatively impact the accuracy of measurements computed by the radar sensor system. A conventional radar sensor system may transmit the range measurement to a computing system, and the computing system may determine the altitude of the aircraft based upon the received range measurement. Conventionally, however, computing systems are not configured to compute multi-dimensional positions of an aircraft in an environment based upon range measurements provided by a radar system due to the possibility of interference referenced above and inaccuracies associated with computing multi-dimensional position using sparse data.

SUMMARY

The following is a brief summary of subject matter that is described in greater detail herein. This summary is not intended to be limiting as to scope of the claims.

Described herein is a range-Doppler radar system that may be coupled to an object in flight such as an aircraft. The range-Doppler radar system includes at least one antenna and processing circuitry that is in communication with the at least one antenna. The processing circuitry is configured to perform several acts, where the acts include causing the at least one antenna to emit a radar signal towards a surface of the earth as the aircraft is flying over the surface of an environment such as the earth. The acts also include obtaining an electrical signal that is representative of a radar return detected by the at least one antenna, where the radar return is based upon the radar signal reflecting from the surface of the earth. The acts further include computing a range measurement based upon the electrical signal, wherein the range measurement is indicative of a distance from the aircraft to the surface of the earth. The acts additionally include transmitting the range measurement to a computing system, wherein the computing system computes a multi-dimensional position of the aircraft based upon the range measurement computed by the processing circuitry of the radar system.

Also disclosed herein is a method for navigating an aircraft in an environment, where the method includes computing range measurements and corresponding Doppler measurements based upon radar echo signals that have reflected off a surface of an environment while the aircraft is flying over the surface of the environment. The method also includes selecting a range measurement from the range measurements based upon a Doppler measurement assigned to the range measurement. The method additionally includes computing a multi-dimensional position of the aircraft based upon the range measurement selected from the range measurements. The method further includes controlling a mechanical system of the aircraft based upon the computed multi-dimensional position of the aircraft.

Further disclosed herein is a computer-readable storage medium that includes instructions that, when executed by a processor, cause the processor to perform several acts. The acts include receiving range measurements and Doppler measurements that are assigned to the range measurements, where a Doppler radar system onboard an aircraft generates the range measurements and Doppler measurements based upon detected radar echo signals. The acts also include computing a multi-dimensional position of the aircraft based upon the range measurements and Doppler measurements that are assigned to the range measurements.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

FIG. 2 is a functional block diagram of elements of the aircraft of FIG. 1 that includes a mechanical system, a computing system, a radar system, and an inertial sensor in accordance with an embodiment of the present invention.

DETAILED DESCRIPTION

Figure 1:
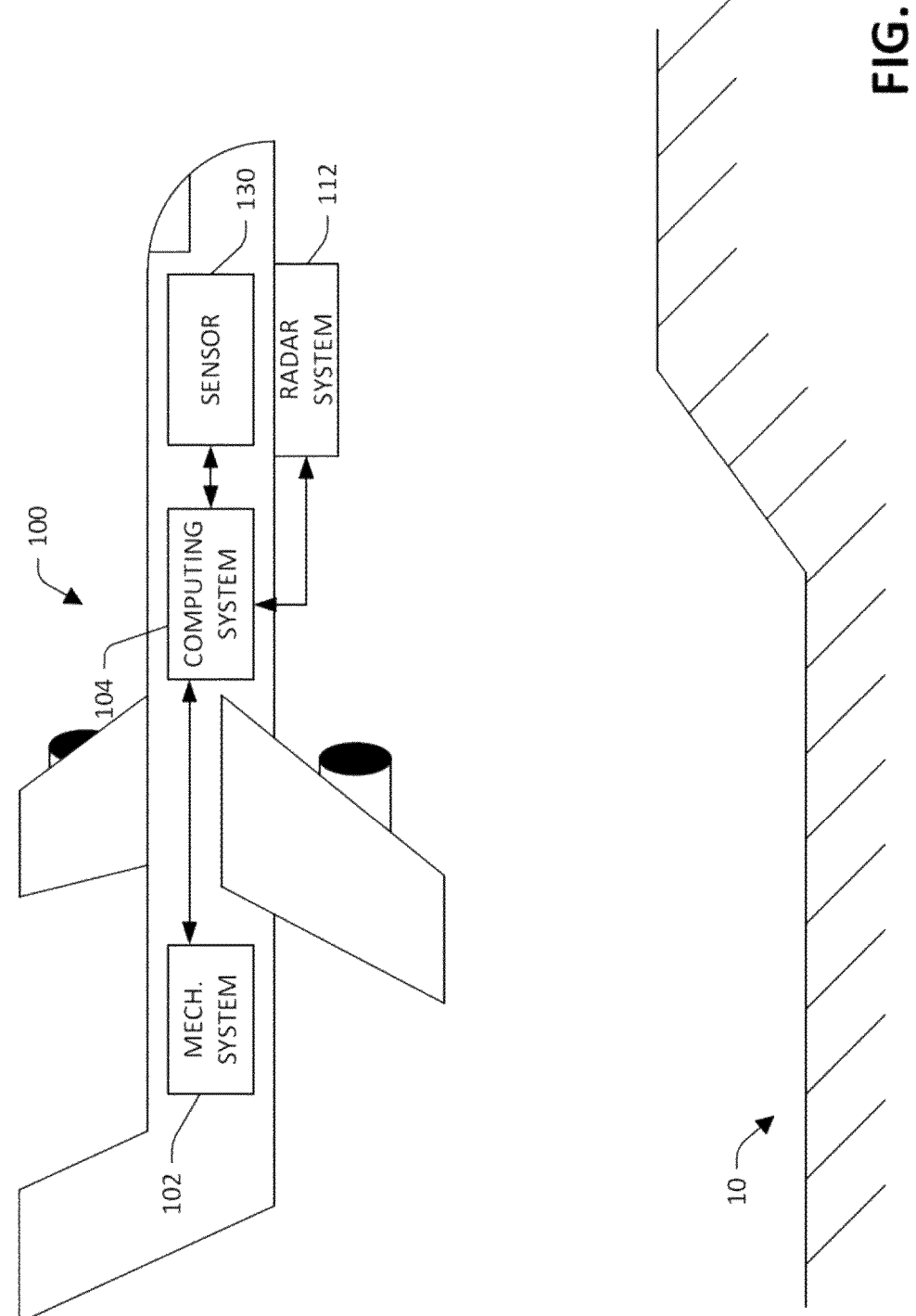
FIG. 1 is a schematic that illustrates an aircraft that includes a computing system and a radar system in accordance with an embodiment of the present invention.

Various technologies pertaining to processing of signals (such as signals generated by a radar system) in an aircraft are now described with reference to the drawings, where like reference numerals are used to refer to like elements throughout. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system modules may be performed by multiple modules. Similarly, for instance, a module may be configured to perform functionality that is described as being carried out by multiple modules.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Described herein are various technologies pertaining to computing a multi-dimensional position of an object in flight such as an aircraft in an environment based upon range measurements output by a radar sensor coupled to the aircraft and then using such position to, for example, autonomously control the aircraft or provide a flight suggestion to a pilot of the aircraft. Multi-dimensional position can refer to latitude/longitude coordinates, altitude, attitude, etc., of the aircraft. A radar system may generate range measurements that are indicative of distances between the radar system and points on the surface of the environment. The radar system may then transmit the range measurements to a computing system of the aircraft that is in communication with the radar system, where the computing system of the aircraft may generate a multi-dimensional position of the aircraft in the environment based upon the range measurements. In an embodiment, the computing system of the aircraft may correlate the range measurements with points in a digital terrain map that represents the surface of the environment to ascertain position of the aircraft relative to the surface of the environment. Based upon the computed position of the aircraft, the computing system may output a command to a mechanical system of the aircraft such that the aircraft performs a flight maneuver, including, but not limited to, ascending, descending, steering, banking or turning, accelerating, decelerating, or landing.

The technologies described herein have various advantages over conventional technologies utilized in aircrafts to compute positions of aircrafts. For instance, position of an aircraft may be computed relatively accurately based upon ranges output by a radar sensor system on the aircraft. Further, the position can be used together with or alternatively to position information computed based upon outputs of an IMU.

Referring now to FIG. 1, an aircraft 100 is illustrated in accordance with embodiments of the present invention. While illustrated as an airplane, it is to be understood that the aircraft 100 may be a jet, a cargo plane, an amphibious aircraft or floatplane, a biplane, a glider, a gyroplane, a helicopter, a tiltrotor, a blimp, a hot air balloon, a drone, or other object in flight. The aircraft 100 includes a mechanical system 102, a computing system 104, and a radar system 112. The mechanical system 102 is used in connection with operating, landing, and/or otherwise maneuvering the aircraft 100 and may include a propulsion system (e.g., an engine, a turbine, a propeller, etc.), a lift/descent system (e.g., wings, elevators), a steering system (e.g., tillers, ailerons, rudders, stabilators), a stability augmentation system, a landing system (e.g., wheels, landing gears, etc.), and/or a braking system. The mechanical system 102 may also include a fuel system, a pneumatic or hydraulic system, an electrical system, a lubrication system, a heating and cooling system, a cabin control system, an oxygen system, an exhaust system, a cooling system, an ice mitigation system, a communication system, an avionics system, and/or a suspension system.

The computing system 104 may be configured to compute a multi-dimensional position of the aircraft 100 in an environment (and can compute other navigational states, such as velocity, acceleration, and so forth), operate the aircraft 100, and/or maneuver or otherwise control flight and operation of the aircraft 100 in the environment.

Figure 2:
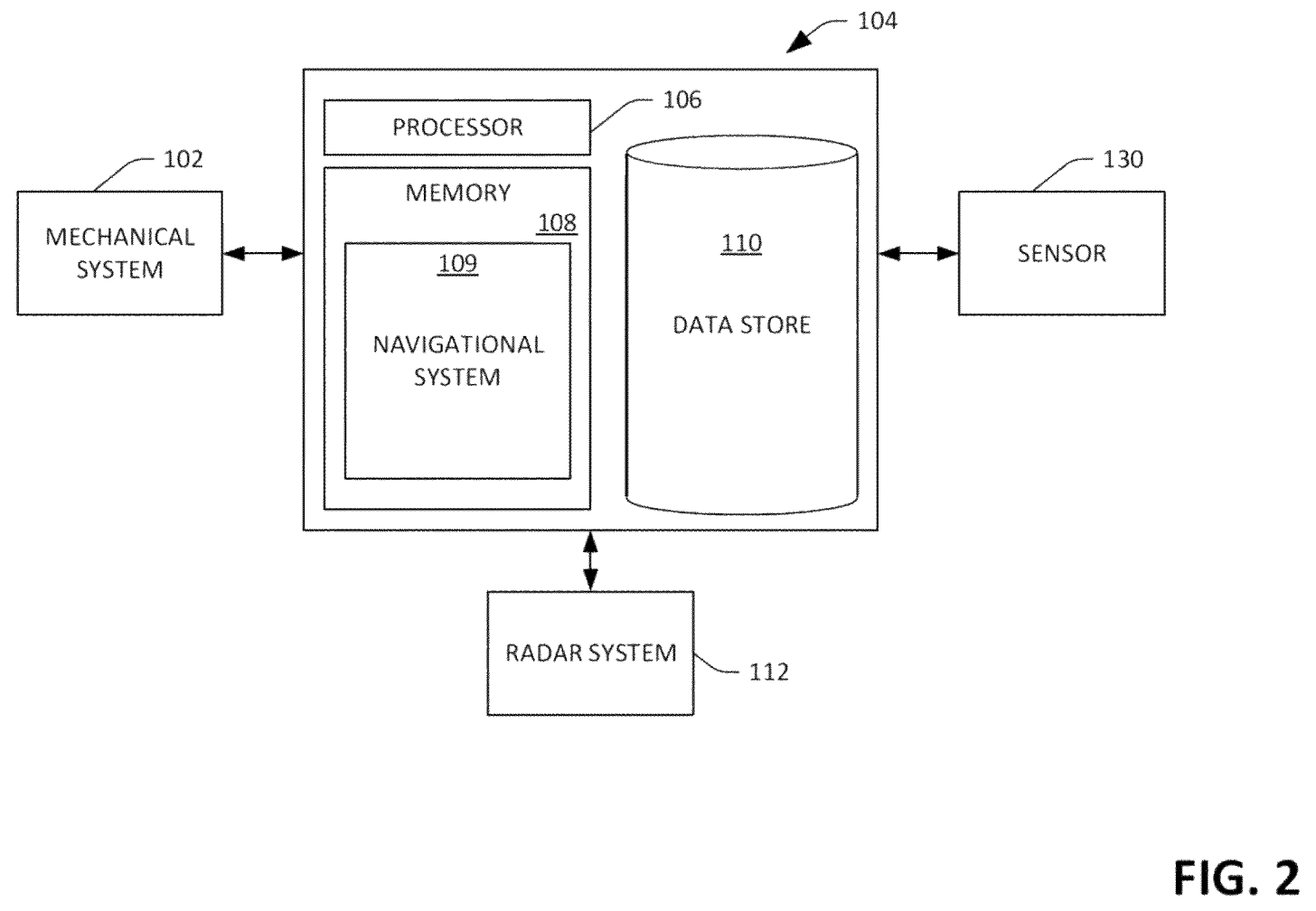

As shown in FIG. 2, the computing system 104 may include a processor 106 that executes instructions that are stored in a memory 108. The memory 108 may have a navigational system 109 loaded therein that is configured to compute a multi-dimensional position of the aircraft (such as latitude/longitude coordinates of the aircraft 100 and altitude of the aircraft 100) based upon the data received from the radar system 112 of the aircraft 100. The computing system 104 may also include a data store 110 in communication with the processor 106, where the data store 110 may include known positional and/or elevational information pertaining to the environment (e.g., a digital terrain map for the environment over which the aircraft 100 is flying). The computing system 104 may be configured to output a command to the mechanical system 102 based upon the computed multi-dimensional position such that the aircraft 100 performs a flight maneuver, including, but not limited to, ascending, descending, steering, banking or turning, accelerating, decelerating, or landing based upon the command.

The radar system 112 may be configured to generate an output indicative of the range of the aircraft 100 relative to a surface 10 of the environment (including the ground, structures built in the environment, and so forth). In an embodiment, the radar system 112 may emit radar signals into the environment of the aircraft 100 and detect echo signals (reflections of the emitted radar signals) that have reflected from the surface of the environment of the aircraft 100; the radar system 112 may generate range measurements (distances from the radar system 112 to points on the surface 10 of the environment) based upon the detected echo signals. In an embodiment, the radar system 112 may be a range-Doppler radar configured to compute Doppler measurements for the detected echo signals reflected from the surface 10; thus, the radar system 112 may compute range measurements and Doppler measurements, where Doppler measurements are assigned to range measurements. Further, the radar system 112 be configured to generate cross-track angle measurements based upon detected echo signals, such that range measurements can be assigned cross-track angle measurements. For example, the radar system 112 can include a range-Doppler-angle radar configured to detect the cross-track angle for the detected echo signals reflected from the surface 10.

The radar system 112 may be a nadir-pointed radar system. The radar system 112 may be any suitable type of radar system, such as a synthetic-aperture radar system, an interferometric radar (including an interferometric synthetic aperture radar (InSAR)), a monopulse radar system, a continuous wave (CW) radar system (including a frequency modulated continuous wave (FMCW) radar system, or an unmodulated CW radar system) or a pulsed radar system. Additionally, the radar system 112 may include one or more filters such that nearby communication frequencies, such as 5G broadband cellular communication frequencies, do not interfere with the operation of the radar system 112.

While the radar system 112 is shown as being located on the underside of the aircraft 100 and substantially at the middle of the aircraft 100, it is to be understood that the radar system 112 can be positioned at any suitable location within or upon the aircraft 100. While not illustrated, the aircraft 100 may also include a lidar sensor system, an ultra-sonic sensor system, an infrared sensor system, and/or other suitable sensor systems.

Figure 3:
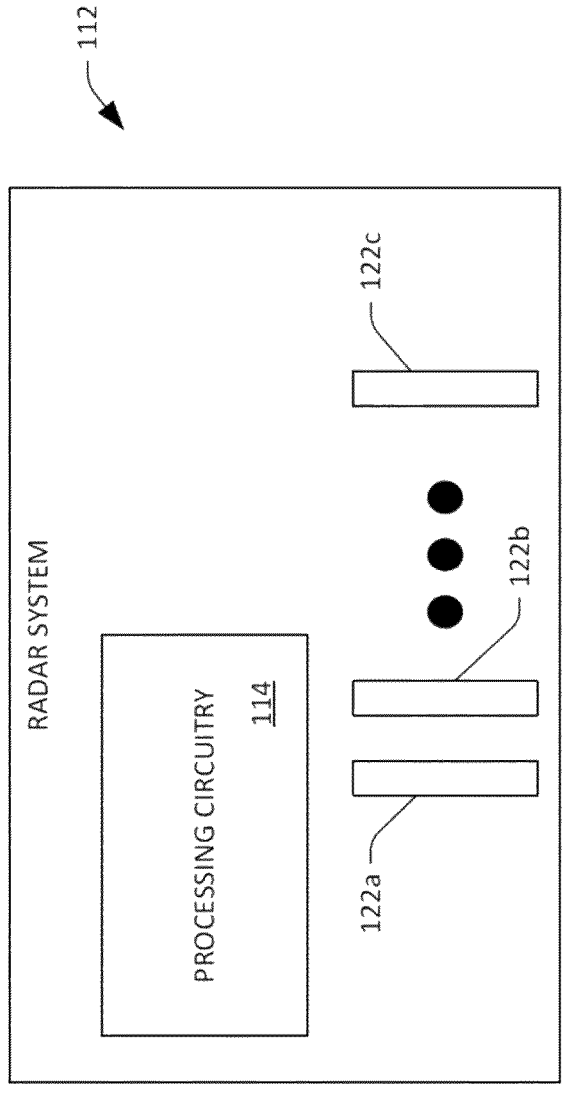
FIG. 3 is a functional block diagram of a radar system that includes processing circuitry and antennas in accordance with an embodiment of the present invention.

FIG. 3 is a functional block diagram of a radar system 112. The radar system 112 may include several antennas 122a-122c, where the antennas 122a-122c include a transmitting antenna and a receiving antenna (or a single antenna that operates as both a transmitter and receiver). A transmitting antenna may emit radar signals into an environment of the aircraft 100 and a receiving antenna may be configured to detect echo signals reflected from the surface 10 of the environment (reflections of the radar signals emitted by the transmitting antenna). The radar system 112 also includes processing circuitry 114, where the processing circuitry 114 is in communication with the antennas 122a-c. The processing circuitry 114 may be configured to receive electrical representations of the detected echo signals from the receiving antenna as input and compute range and Doppler measurements based upon the electrical representations of the detected echo signals. The processing circuitry 114 may also be configured to compute cross-track angle measurements based upon the representations of the detected echo signals. The processing circuitry 114 may transmit the range measurements to the computing system 104. Further, the processing circuitry 114 may transmit Doppler measurements with the range measurements and may further transmit cross-track angle measurements to the computing system 104.

As shown in FIG. 2, the aircraft 100 may optionally include an inertial sensor system 130. The inertial sensor system 130 may be configured to generate an output indicative of the position or movement of the aircraft 100, such as the acceleration, angular or rotational rate, orientation, attitude, velocity, latitudinal/longitudinal coordinates, and/or the like. The inertial sensor system 130 may include sensors capable of determining the position and/or movement of the aircraft 100. For example, the inertial sensor system 130 may include an inertial measurement unit (IMU), accelerometer, gyroscope, or other suitable sensor, or any combination thereof. Further, while not illustrated, the aircraft 100 may further include a positional sensor system, such as a global positioning system (GPS) receiver. The inertial sensor system 130 and/or the positional sensor system may transmit their outputs to the computing system 104.

Figure 4:
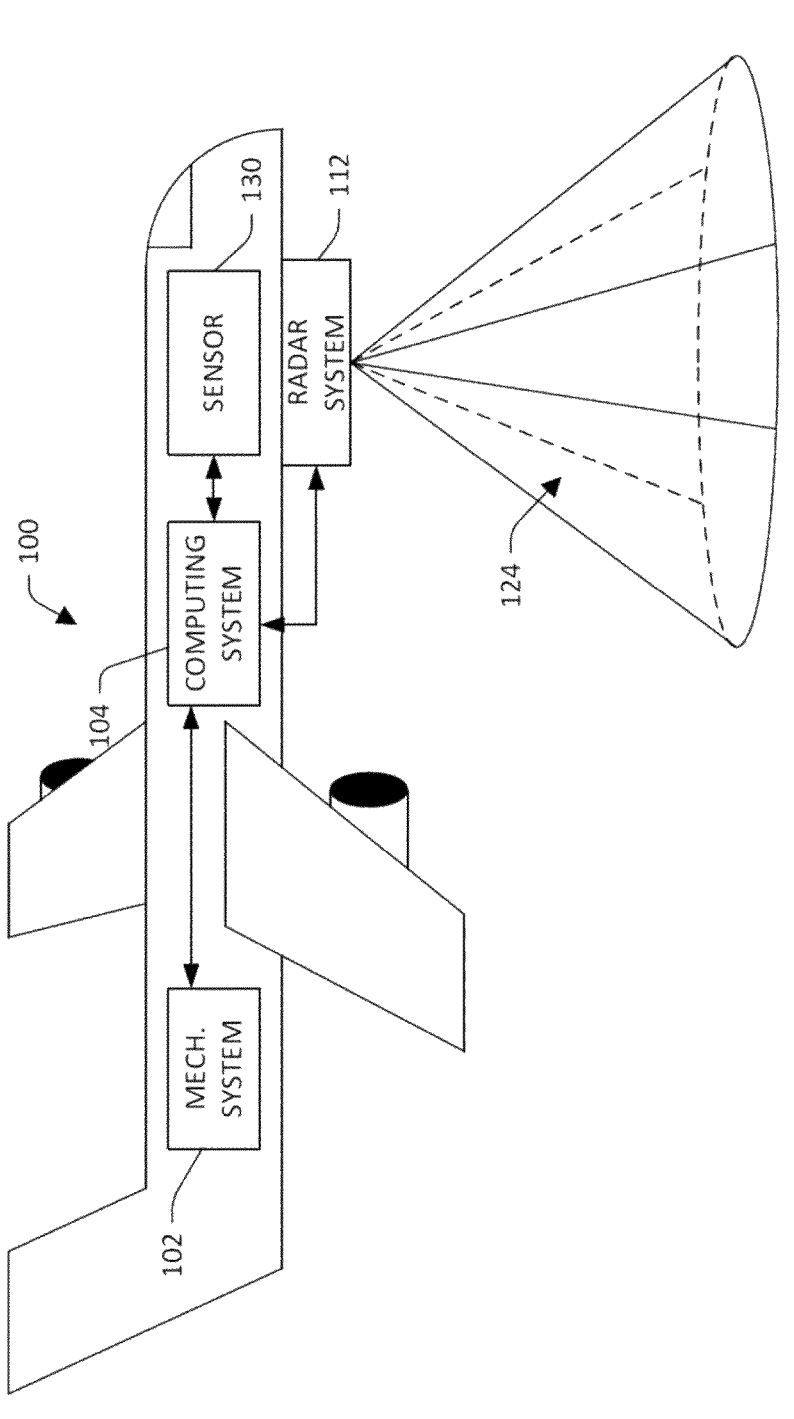
FIG. 4 depicts an irradiated area emitted into an environment by the radar system of the aircraft of FIG. 1 in accordance with an embodiment of the present invention.

Operation of the radar system 112 is now set forth. As shown in FIG. 4, a radar system 112 may irradiate an area 124 below the aircraft 100 with radar signals. The irradiated area 124 may extend beneath the aircraft 100 to cover a portion of the surface of the environment in which the aircraft 100 is operating. The radar system 112 may detect radar signals (echo signals) that reflect from a portion of the surface covered by the irradiated area 124. In the illustrated embodiment, the irradiated area 124 may be cone shaped with a substantially circular base when the surface is flat. However, it will be appreciated that the irradiated area 124 may have any suitable shape. For example, the base of the irradiated area 124 (when the surface is flat) may be elliptical, oval, or egg-shaped.

Figure 5:
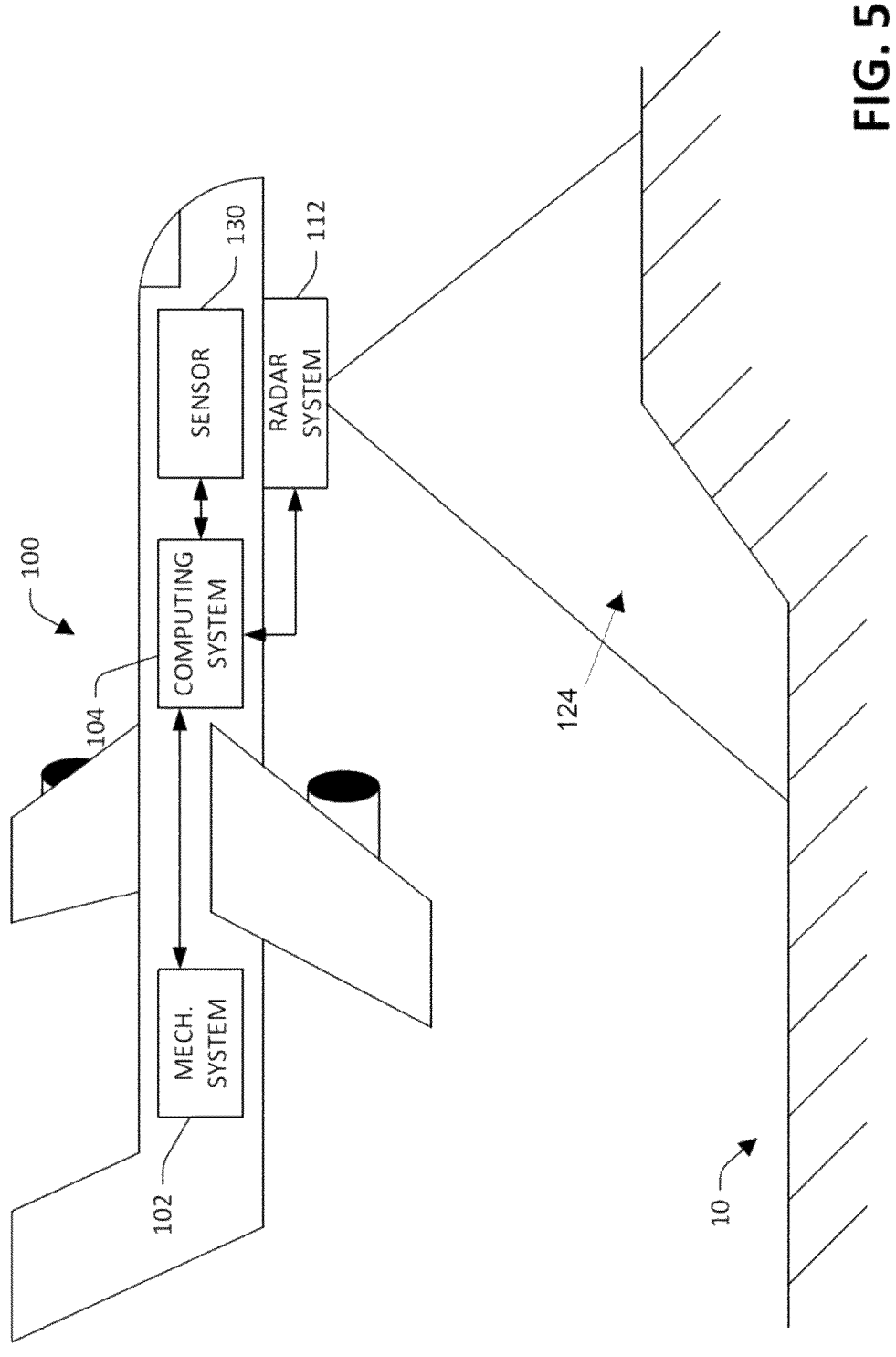
FIG. 5 depicts the irradiated area emitted by the radar system of the aircraft of FIG. 4 projected on the surface of an environment in accordance with an embodiment of the present invention.

FIG. 5 is a schematic view of the aircraft 100 emitting an irradiated area 124 over a portion of the surface 10 of the environment below the aircraft 100. As shown in FIG. 5, the radar system 112 may emit radar signals beneath the aircraft 100 such that the radar system 112 may be able to detect echo signals from points along the surface 10 covered by the irradiated area 124. The processing circuitry 114 of the radar system 112 may compute range measurements that are indicative of distances from the radar system 112 of the aircraft 100 to the surface 10 (within the irradiated area 124) and transmits the range measurements to the computing system 104. The processing circuitry 114 of the radar system 112 may also compute the Doppler measurements and/or the cross-track angle measurements corresponding to the echo signals and transmit such measurements to the computing system 104.

Figure 6:
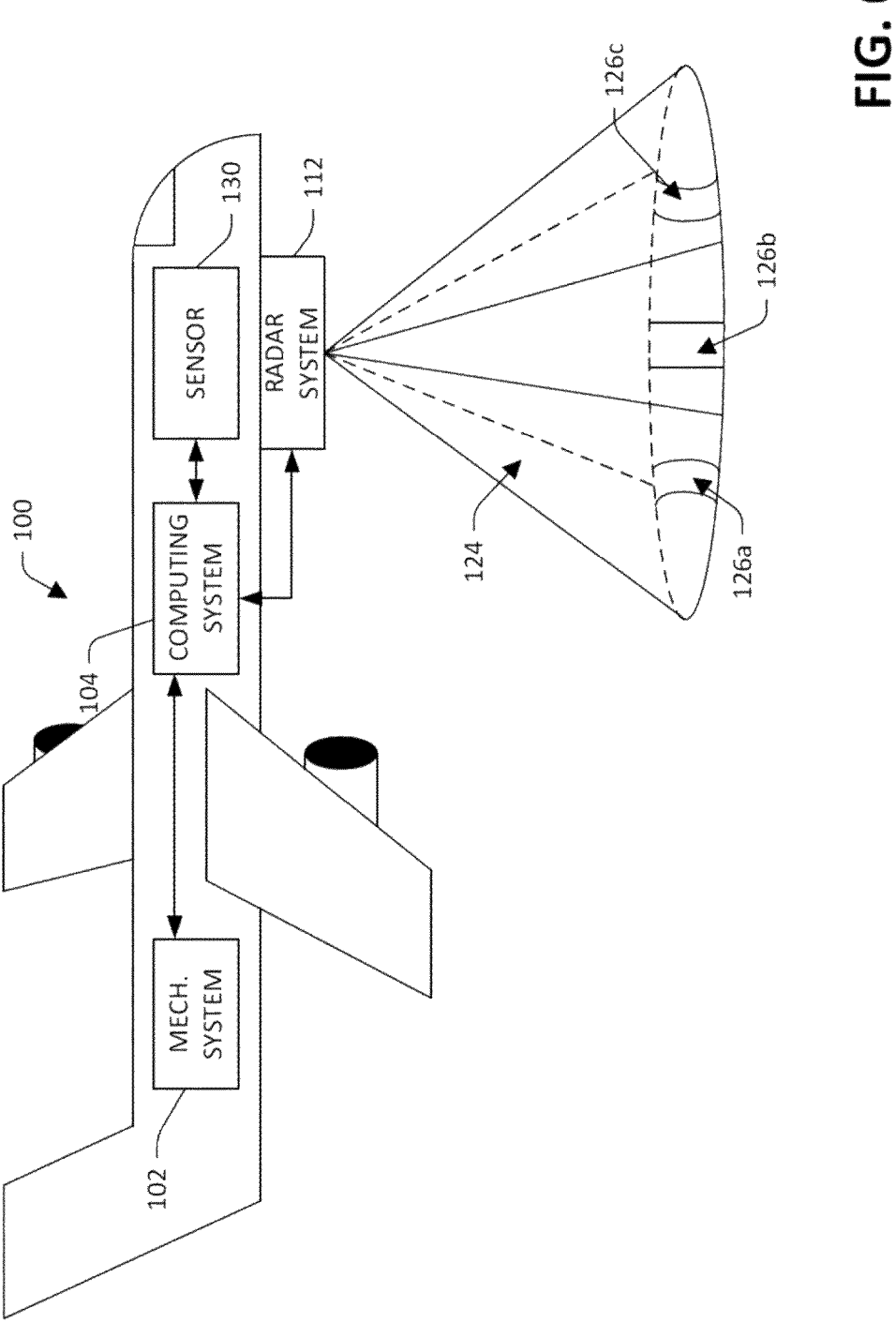
FIG. 6 depicts the irradiated area emitted by the radar system of the aircraft of FIG. 4, where Doppler bins are graphically depicted in accordance with an embodiment of the present invention.

Referring now to FIG. 6, it is understood that echo signals that reflect off the surface 10 at different positions within the irradiated area 124 (along a direction of travel of the airplane) may exhibit different Doppler shifts due to motion of the aircraft 100 relative to the surface of the earth; the processing circuitry 114 of the radar system 112 may compute Doppler measurements for the detected echo signals at a resolution for which the processing circuitry 114 is configured. As illustrated in FIG. 6, range measurements may be placed in Doppler bins based upon Doppler measurements assigned to the range measurements, such that different ranges having the same Doppler measurement assigned thereto are placed in a same bin. FIG. 6 graphically depicts three different Doppler bins 126a, 126b, and 126c that correspond to different Doppler shifts detected by the radar system 112. For example, the antennas 122a-c may detect echo signals from the surface 10 covered by the irradiated area 124 and the processing circuitry 114 may be configured to generate range measurements that are indicative of distances between the aircraft 100 and the surface 10 as well as Doppler measurements for the range measurements. Based upon the Doppler measurements, the range measurements may be assigned to Doppler bins (126a-c). In the illustrated embodiment, range measurements are assigned to one of three Doppler bins. However, it is understood that the number of bins can be a function of resolution of the radar system 112.

Figure 7:
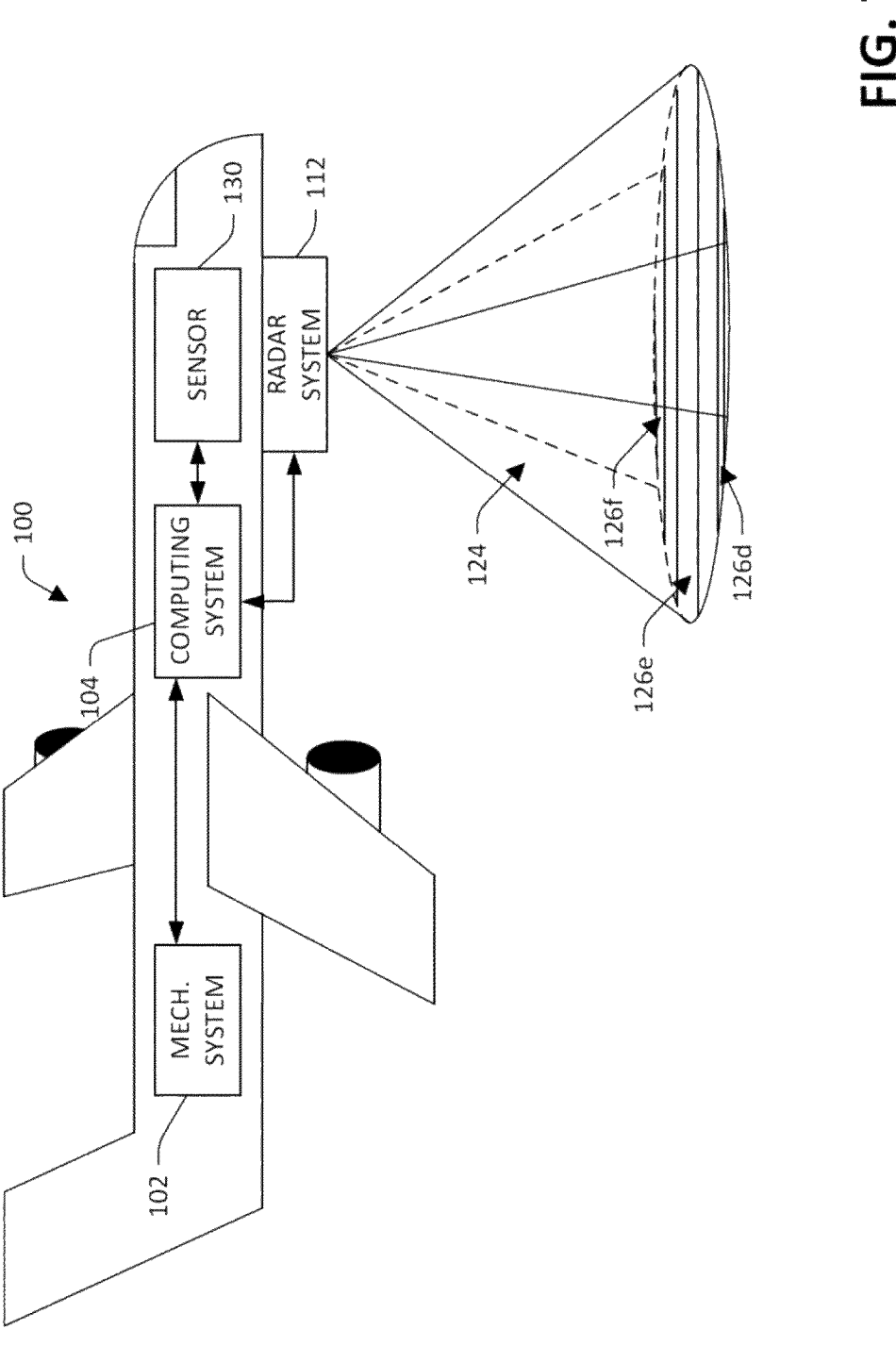
FIG. 7 depicts the irradiated area emitted by the radar system of the aircraft of FIG. 4, where cross-track angle bins are depicted in accordance with an embodiment of the present invention.

As shown in FIG. 7, the processing circuitry 114 of the radar system 112 can be further configured to assign range measurements to Doppler-cross-track angle bins. As graphically depicted in FIG. 7, the radar system 112 may support three different cross-track angle bins 126d, 126e, and 126f. Therefore, a range measurement may have a cross-track angle assigned thereto and may further have a Doppler measurement assigned thereto. The range measurement may be assigned to a bin based upon the cross-track measurement and the Doppler measurement assigned thereto. Hence, two different range measurements having the same cross-track angle measurement and the same Doppler measurement assigned thereto may be placed in the same Doppler-cross-track angle bin. Therefore, when there are three different Doppler bins and three different cross-track angle bins, there may be 9 different Doppler-cross-track angle bins.

Referring back to FIG. 3, and as indicated above, the processing circuitry 114 may be configured to generate a tensor (also referred to as a data cube) that includes range, Doppler, and (optionally) cross-track angle measurements. When the tensor includes range and Doppler measurements, the tensor can be represented as a two-dimensional image.

Figure 8:
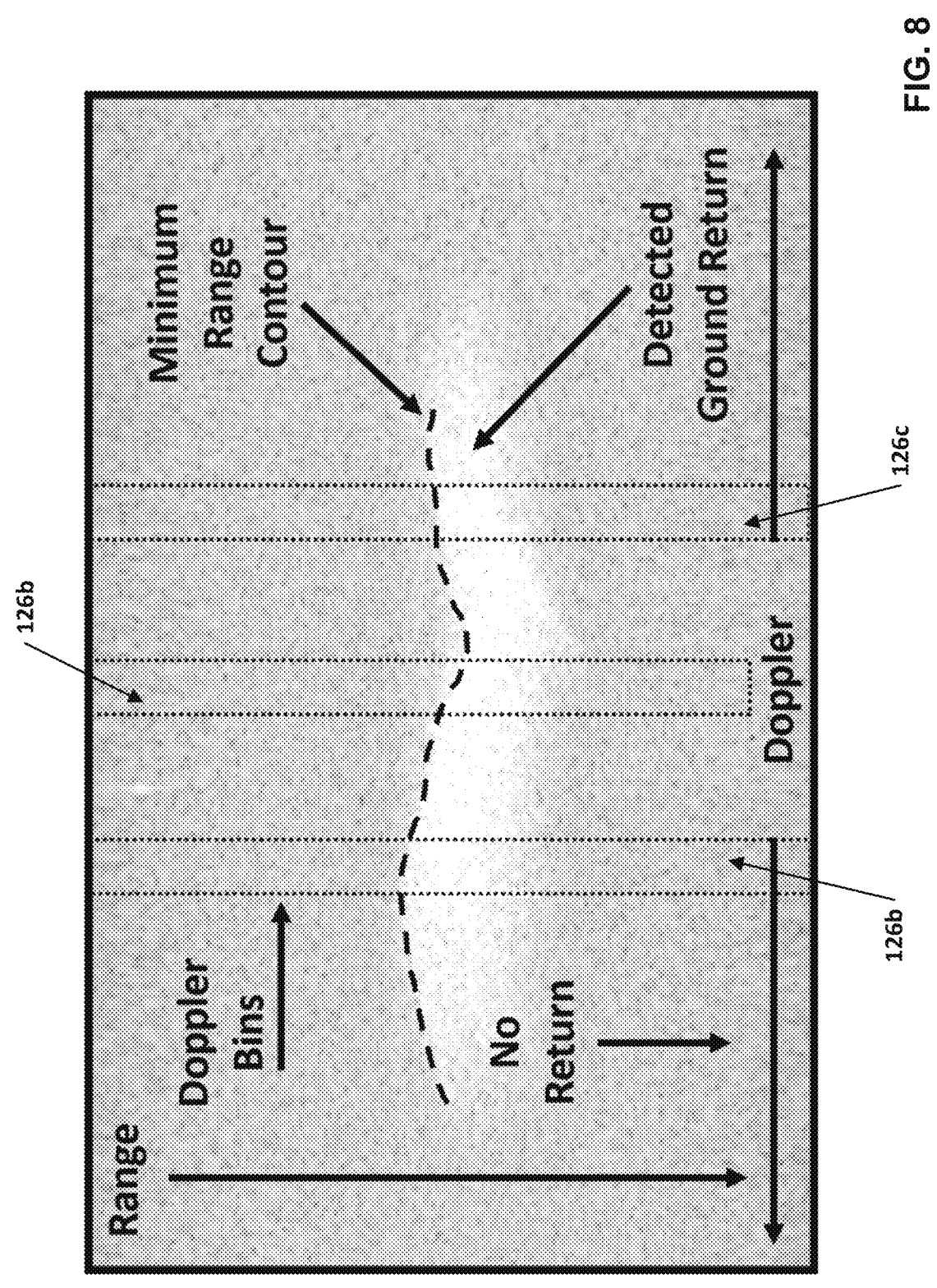
FIG. 8 depicts range and Doppler measurements output by a range-Doppler radar system in accordance with an embodiment of the present invention.

With reference to FIG. 8, a two-dimensional image that depicts range and corresponding Doppler measurements is illustrated. Darker pixels depict weak or no detected echo signal and lighter pixels indicate range and Doppler measurements where echo signals were detected. The image is divided to depict the three different Doppler bins 126a, 126b, and 126c, which correspond to three different strips that are transverse to the direction of flight of the aircraft 100. As noted previously, however, the data represented by the image may be three-dimensional in nature (and can include cross-track angle measurements).

Optionally, the processing circuitry 114 may identify range measurements from each of the three bins (depicted in FIG. 8) based upon values of the range measurements in the bins. For instance, with respect to a Doppler bin, the processing circuitry 114 may identify the lowest range measurement across Doppler values in a Doppler bin and performs such task for each Doppler bin (in this example, three total range measurements are identified, one from each of the three Doppler bins). More specifically, if there are three Doppler bins, the processing circuitry 114 may output three range measurements-one range measurement for each Doppler bin. Referring briefly back to FIG. 6, the processing circuitry 114 may output three range measurements (one for each bin): a first measurement for the first bin 126a, a second measurement for the second bin 126b, and a third measurement for the third bin 126c, where the three measurements are the three range measurements from the radar system 112 to points on a surface 10 corresponding to the bins. For instance, presuming that the surface 10 is flat, a first range measurement output by the processing circuitry 114 may be a range from the radar system 112 to a point on the surface 10 that is in a center of the irradiated area 124 in a direction of travel of the aircraft and on the right edge of the first bin 126a (from the perspective of the drawings, in the direction of flight), a second range measurement output by the processing circuitry 114 is a range from the radar system 112 to a point on the surface 10 directly beneath the aircraft 100 (in the second bin 126b), and a third measurement value output by the processing circuitry 114 is a range from the radar system 112 to a point on the surface 10 that is in a center of the irradiated area 124 in a direction of travel of the aircraft 100 and on the left edge of the third bin 126c. In another embodiment, the computing system 104 may receive the radar tensor and may identify range measurements utilizing the approach described above.

Figure 9:
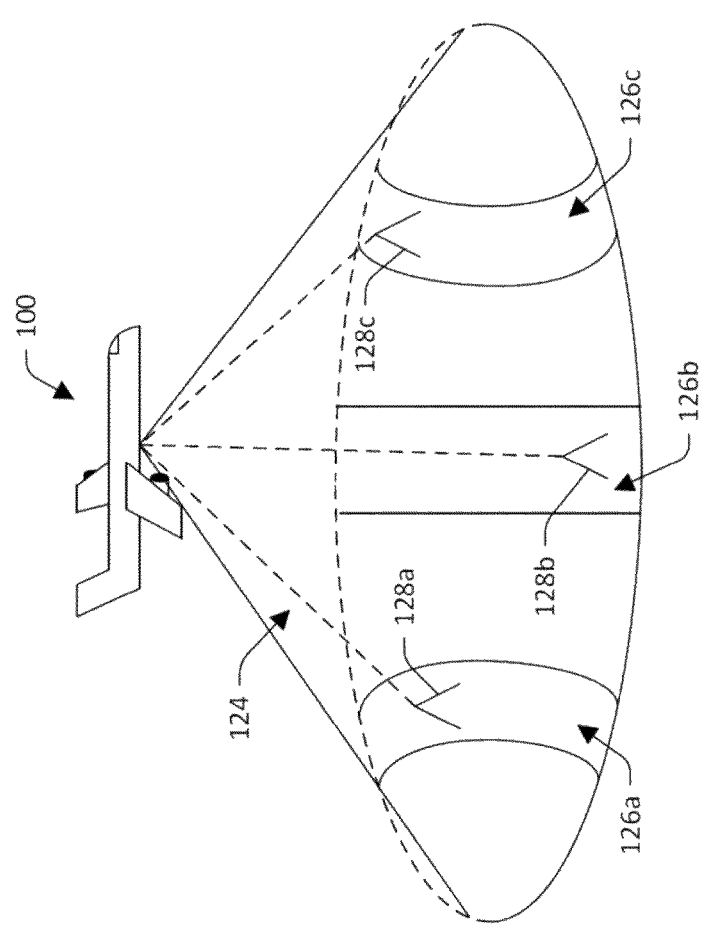
FIGS. 9 and 10 depict illustrative examples of points that correspond to range measurements selected for use when computing position of an aircraft in accordance with an embodiment of the present invention.
Figure 10:
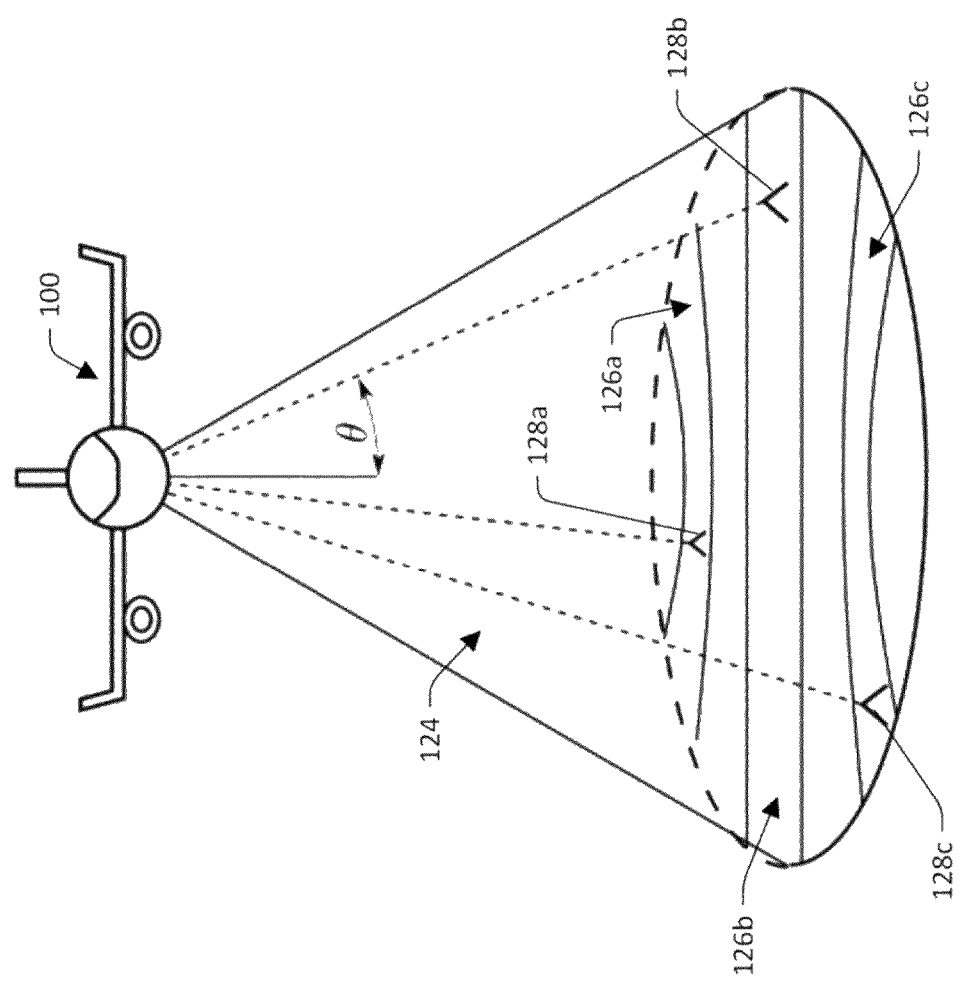

As shown in the illustrative examples of FIGS. 9-10, the radar system 112 may identify range measurements that correspond to points 128a-c in the environment of the aircraft 100 and transmit such range measurement to the computing system 104 (or the computing system 104 can identify such range measurements). Again, these points 128a-c may correspond to locations within the irradiated area 124, and respectively within strips corresponding to the Doppler bins 126a-c, that are the shortest distances from the radar system 112 to the surface 10.

In an embodiment, the navigational system 109 shown in FIG. 2 may receive the range measurements corresponding to the Doppler bins and compute a multi-dimensional position of the aircraft 100 based in part upon the range measurements. For example, the navigational system 109 may compute position and heading of the aircraft 100 based upon the range measurements. As noted above, the data store 110 may include digital terrain maps that identify elevations of the surface 10 relative to some standard (e.g., sea level), such digital terrain elevation maps may be provided by the United States Geological Survey for environments on the earth's surface. To compute a multi-dimensional position of the aircraft 100, the navigational system 109 may initially estimate a position of the aircraft based upon previous radar signals, output of a GPS receiver, and/or output of the inertial sensor system 130. The navigational system 109 may further correlate the range measurements with elevation values of digital terrain maps. In an embodiment, the range measurements may be fit to the digital terrain map to determine a position of the aircraft 100 relative to the surface 10.

For instance, given an estimated position, the altitude of the aircraft 100 may be given by the range measurement that represents range to the surface 10 directly beneath the aircraft 100. Because the other range measurements represent shortest ranges in the Doppler bins, and because the altitude of the aircraft 100 is known, and further because a heading of the aircraft 100 can be known or estimated, points in a digital terrain map that should correspond to the other range measurements may be identified and distances from the aircraft 100 to positions on the surface 10 represented by those positions in a digital terrain map may be computed. The navigational system 109 may compare these computed range measurements with the actual range measurements; if such values correspond to one another, then the navigational system 109 may output the estimated position as the position of the aircraft 100. When the values do not correspond, a search can be performed over digital terrain maps to identify a position of the aircraft 100 relative to the surface 10 until computed measurements correspond to the range measurements output by the radar system 112.

Figure 13:
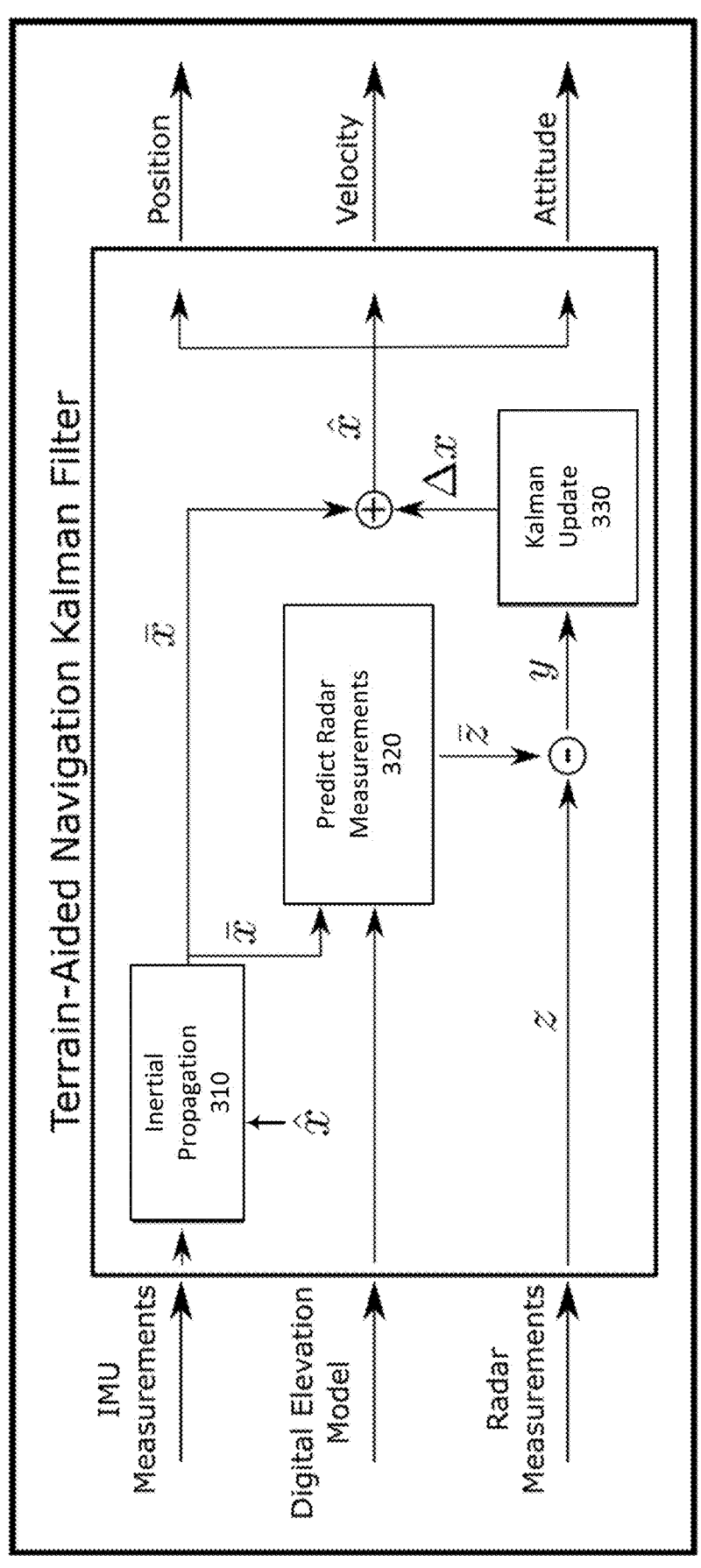
FIG. 13 is a block diagram of an algorithm in accordance with an embodiment of the present invention.

In an embodiment, the navigational system 109 may employ the algorithm 300 shown in FIG. 13 to determine or improve previous determinations of at least the position, velocity, and attitude of an aircraft 100 in some environment. In algorithm 300, an inertial propagation module (IPM) 310, which may be an inertial navigation system (INS) in an embodiment, may estimate several attributes of the aircraft movement in space based on signals received from a sensor module 130 data (IMU measurements or signals in an embodiment). The IPM 310 may generate a vector $\bar{x}$ including nine (in an embodiment) different attributes of the movement of an aircraft in three-dimensional (3-D) space (in flight in an environment) including its estimated 3-D position, 3-D velocity, and 3-D attitude of the aircraft.

In an embodiment, the sensor module 130 may include an IMU or satellite navigation system (when available) that may provide multi-dimensional relative motion measurements (such as those generated by ring lasers, accelerometers, gyroscopes, and global navigation satellite systems (GNSS) (which includes GPS, BDS, GLONASS, GALILEO, and others on earth)). Based on the vector $\bar{x}$ that may provide an indication of the 3-D position of the aircraft, a predict radar measurements module (PRMM) 320 may predict or form a minimum range contour (MRC) represented by a vector of distance values $\bar{z}$ such as shown in FIG. 8, the MRC representing the predicted range to the terrain below the flight path of the aircraft at several points. The MRC may include hundreds of values or a limited number of values in an embodiment.

The values $\bar{z}$ forming the predicted MRC may be equal to corresponding radar measurements z of the aircraft if no errors existed (in the radar, digital map, or the predicted position of the aircraft) since the radar also determines the minimum radar values to the terrain at several ground points with prescribed Doppler shifts (bins) along and across the flight path due to the aircraft movement relative to the environment (see FIGS. 9 and 10)—termed minimum range in several prescribed doppler bins (MRPD) in an embodiment. The resultant values of vector z (the MRPD) may form an effective MRC as shown in FIG. 8 to be compared to predicted MRC represented by the values of vector $\bar{z}$.

Note that the environment itself may be moving in an embodiment, e.g., the environment may be the flight deck of an aircraft carrier where the digital elevation model may be a map or model of the island and flight deck of the aircraft carrier for example. Based on the received radar measurements z and predicted radar measurements $\bar{z}$ of the MRC, the algorithm 300 may determine a differential vector or matrix y therebetween.

A vector y representing the difference between the values of the predicted radar measurement vector $\bar{z}$ and the values of the vector z (MRPD) from a radar system 112 may be processed by a Kalman filter 330 (correlated in an embodiment) to produce a correction vector $\Delta x$ to be applied (summed) to the estimate vector $\bar{x}$ to produce an updated, corrected movement vector $\hat{x}$. As noted, the vectors $\bar{x}$, $\Delta x$, and $\hat{x}$ may include nine different attributes of the movement of an aircraft in three-dimensional (3-D) space including its estimated 3-D position, 3-D velocity, and 3-D attitude of the aircraft. In an embodiment, the Kalman filter may be an Extended Kalman Filter. Accordingly, the aircraft's position, velocity, and attitude may be corrected via the correction vector $\Delta x$. In an embodiment, the resultant updated, corrected vector $\hat{x}$ may be a feedback to the IPM 310. The IPM 310 may use the vector $\hat{x}$ in part to determine the next estimate vector $\bar{x}$.

Further, the navigational system 109 of the computing system 104 may identify range measurements generated by the radar system 112 that do not correspond to the digital terrain map. For example, a digital terrain map may represent the surface of the earth at a particular point in time; subsequent to that point in time, an alteration may have been made to the surface of the earth. For example, a building may be constructed where there was not a building at the particular point in time (building 12 in FIG. 11 for example). Thus, when the radar system 112 returns a range measurement that is indicative of a distance from the radar system 112 to the roof of the building, such range measurement may not correlate to points of the surface of the earth represented in the digital terrain map (since the building was recently constructed). Other range measurements may be obtained for a radar scan, however, that correlate to points of the surface of the earth represented in the digital terrain map.

In an embodiment, the navigational system 109 may identify situations where a range measurement does not correspond to the digital terrain map and may discard such range measurement, such that a position of the aircraft 100 may nevertheless be computed. For example, for each radar scan, the radar system 112 may output range measurements for seven different Doppler bins. When the navigational system 109 determines that six range measurements selected from six of the Doppler bins correspond to positions in the digital terrain map while one range measurement does not correspond to a position in the digital terrain map, the navigational system 109 may discard the one range measurement. Therefore, when the navigational system 109 determines that a threshold number of range measurements used to compute the position of the aircraft 100 correspond to points on the digital terrain map, the navigational system 109 may employ such range measurements while discarding others. The navigational system 109 may implement any suitable method to determine which, if any, range measurements do not sufficiently correlate to positions on the digital terrain map. For example, the navigational system 109 can implement Chi-square tests, Z-tests, Z-square tests, and/or Gaussian modeling tests to determine which range measurements may be discarded.

Figure 11:
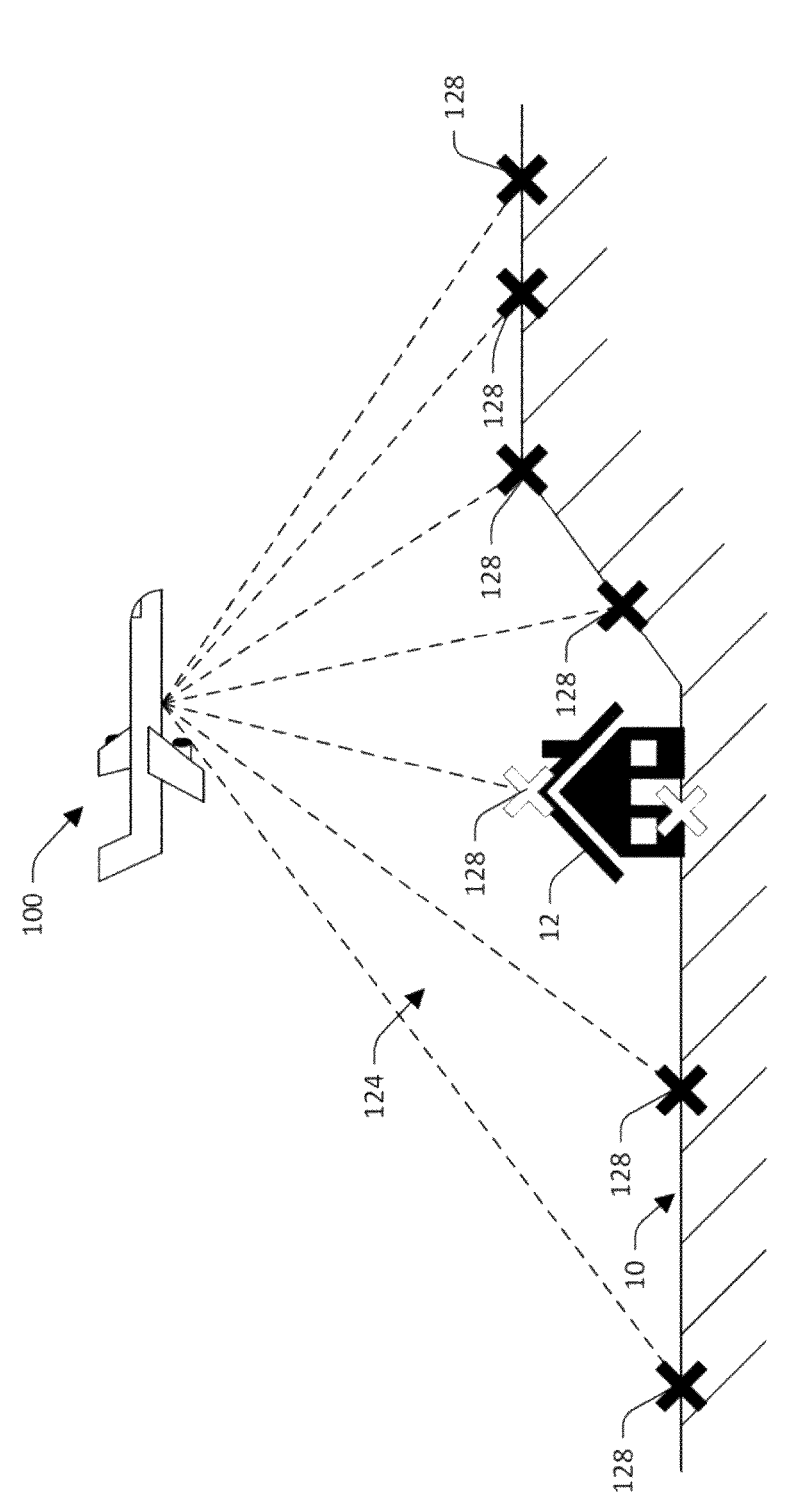
FIG. 11 is an illustrative example depicting a radar signal reflecting from a surface of an environment.

FIG. 11 is an illustration depicting an exemplary situation in which the navigation system 109 may filter a range measurement generated by the radar system 112. In the illustrated embodiment, the radar system 112 irradiates an area of the surface 10 and the navigational system 109 and obtains seven range measurements from seven different Doppler bins. The surface of the earth has a structure 12 constructed thereon; however, the digital terrain map does not include a representation of such structure 12. Therefore, the navigational system 109 is unable to correlate the range measurement (the distance from the aircraft 100 to the structure 12) to a point in the digital terrain map. The navigational system 109, however, is able to correlate other range measurements to the digital terrain map. In an embodiment, the navigational system 109 may discard the range measurement that corresponds to the structure 12.

As noted, the navigational system 109 of the computing system 104 may be optionally configured to generate a second output that is indicative of estimated navigational state(s) of the aircraft 100, where the second output is computed based upon the outputs of the inertial sensor 130 (such as via the inertial propagation module 310). The navigational system 109 may compute navigational state(s) of the aircraft 100 based upon the inertial measurements output by the inertial sensor 130 and previous known navigational state(s) of the aircraft 100. For example, based upon the previously computed navigational state(s) and measurements indicative of the velocity, acceleration, and attitude of the aircraft 100, the navigational system 109 may generate an output indicative of the position and/or elevation of the aircraft 100.

In an embodiment, the computing system 104 may compare a navigational state computed based upon output of the radar system 112 with a navigational state computed based upon output of the inertial sensor 130. If the two navigational states are the same (or within a predefined threshold), the navigational system 109 may output an indication that there is high confidence that the navigational state is accurate. When the two navigational states are different (or the difference between the two states exceeds a threshold), the navigational system 109 may output an indication that there is a discrepancy between the two navigational states. In an embodiment, the computing system 104 may conservatively control operation of the mechanical system 102 when there is a discrepancy (e.g., delay a landing, cause the aircraft 100 to fly straight at high altitude, and so forth). The navigational system 109 may default to using the navigational state computed based upon measurements output by the radar system 112 in case of discrepancy.

Figure 12:
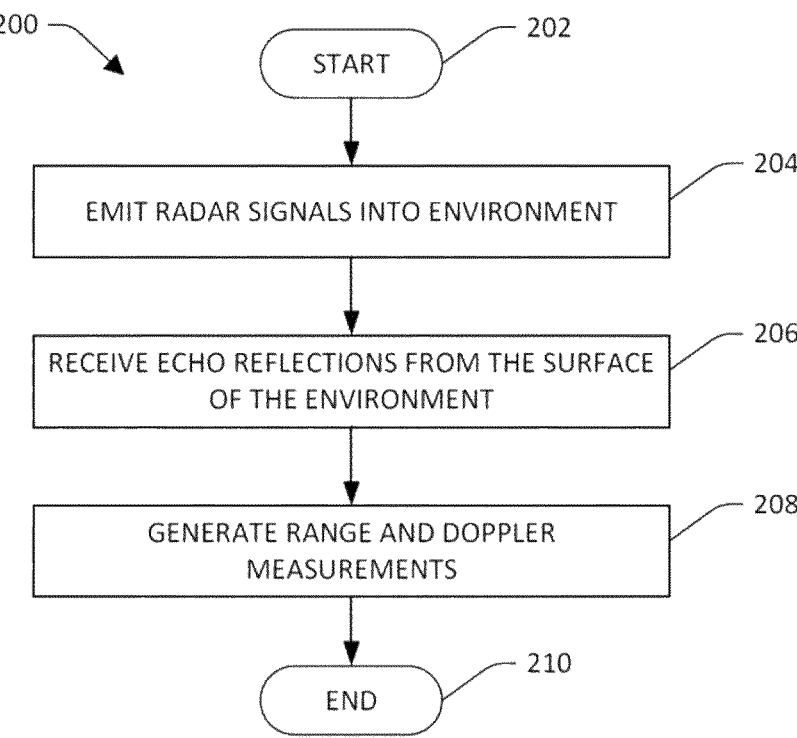
FIG. 12 is a flow diagram illustrating an algorithm for computing a multi-dimensional position of an aircraft during flight in accordance with an embodiment of the present invention.

FIG. 12 illustrates an exemplary algorithm relating to determining positions of aircrafts. While the algorithm is shown as being a series of activities that are performed in a sequence, it is to be understood and appreciated that the algorithm is not limited by the order of the sequence. For example, some activities may occur in a different order than what is described herein. In addition, an activity may occur concurrently with another activity. Further, in some instances, not all activities may be required to implement an algorithm described herein.

Moreover, the activities described herein may be computer-executable instructions that may be implemented by one or more processors and/or stored on a computer-readable medium or media. The computer-executable instructions can include a routine, a sub-routine, programs, a thread of execution, and/or the like. Still further, results of acts of the methodologies can be stored in a computer-readable medium displayed on a display device, and/or the like.

With reference to FIG. 12, a flow diagram illustrating an algorithm 200 performed by a radar system of an aircraft is illustrated. The algorithm starts at 202, and at 204, radar signals are emitted into an environment surrounding the aircraft. The radar signals are emitted by transmitting antennas of the radar system. At 206, echo reflections from a surface of the environment are received, where the echo reflections are detected by one or more receiving antennas of the radar system.

At 208, range and Doppler measurements are generated based upon the detected echo reflections, where range measurements have Doppler measurements assigned thereto. A computing system on the aircraft computes a multi-dimensional position (e.g., latitude/longitude) based upon the range measurements and the Doppler measurements assigned thereto. For instance, range measurements may be assigned to Doppler bins based upon Doppler measurements that are assigned to the range measurements. As noted above, the computing system may select a range measurement from each bin based upon range measurements included in the bins. In an embodiment, the computing system may select a range measurement from a Doppler bin due to the range measurement being the lowest from amongst all range measurements in the Doppler bin. To compute the multi-dimensional position of the aircraft, the computing system may correlate range measurements selected from bins with positions in a digital terrain map that represents a surface of the earth over which the aircraft is travelling. The computing system may control a mechanical system of the aircraft based upon the multi-dimensional position. In another example, the computing system can output a suggestion to a pilot of the aircraft based upon the multi-dimensional position. The algorithm 200 completes at 210.

Various technologies have been disclosed herein, wherein such technologies correspond to at least the following examples.

(A1) In accordance with an aspect, an algorithm performed by processing circuitry of a range-Doppler radar system that is coupled to an aircraft is described herein, where the algorithm includes causing at least one antenna of the range-Doppler radar system to emit a radar signal towards a surface of the earth as the aircraft is flying over the surface of the earth. The algorithm also includes obtaining an electrical signal that is representative of a radar return detected by the at least one antenna, where the radar return is based upon the radar signal reflecting from the surface of the earth. The algorithm further includes computing a range measurement based upon the electrical signal, wherein the range measurement is indicative of a distance from the aircraft to the surface of the earth. The algorithm additionally includes transmitting the range measurement to a computing system, where the computing system computes a multi-dimensional position of the aircraft based upon the range measurement computed by the processing circuitry of the range-Doppler radar system.

(A2) In some embodiments of the algorithm of (A1), the algorithm further includes computing a Doppler measurement based upon the electrical signal, wherein the Doppler measurement is assigned to the range measurement, and further wherein the computing system computes the multi-dimensional position of the aircraft based upon the Doppler measurement.

(A3) In some embodiments of the algorithm of (A2), the Doppler measurement indicates that the range measurement is indicative of a distance from the aircraft to a point on the surface of the earth that is one of: a) in front of the aircraft; b) behind the aircraft; or c) directly beneath the aircraft.

(A4) In some embodiments of the algorithm of at least one of (A1)-(A3), the computing system controls a mechanical system of the aircraft based upon the computed multi-dimensional position of the aircraft.

(A5) In some embodiments of the algorithm of at least one of (A1)-(A4), the computing system causes a suggested aircraft maneuver to be presented to a pilot of the aircraft based upon the computed multi-dimensional position of the aircraft.

(A6) In some embodiments of the algorithm of at least one of (A1)-(A5), the algorithm further includes computing a cross-track angle based upon the electrical signal, where the cross-track angle is assigned to the range measurement, and further where the computing system computes the multi-dimensional position of the aircraft based upon the cross-track angle.

(A7) In some embodiments of the method of at least one of (A1)-(A6), the algorithm also includes computing a second range measurement based upon the electrical signal, where the second range measurement is indicative of a second distance from the aircraft to the surface of the earth.

The algorithm further includes transmitting the second range measurement to the computing system, where the computing system computes the multi-dimensional position of the aircraft based upon the range measurement and the second range measurement.

(A8) In some embodiments of the algorithm of (A7), the algorithm also includes computing a third range measurement based upon the electrical signal, where the third range measurement is indicative of a third distance from the aircraft to the surface of the earth. The algorithm also includes transmitting the third range measurement to the computing system, where the computing system computes the multi-dimensional position of the aircraft based upon the range measurement, the second range measurement, and the third range measurement.

(A9) In some embodiments of the method of (A8), the range measurement is assigned to a first Doppler bin, the second range measurement is assigned to a second Doppler bin, and the third range measurement is assigned to the third Doppler bin. The computing system selects the range measurement, the second range measurement, and the third range measurement to compute the multi-dimensional position of the aircraft based upon the range measurement, the second range measurement, and the third range measurement being assigned to the first Doppler bin, the second Doppler bin, and the third Doppler bin, respectively.

(B1) In accordance with another aspect, an algorithm for navigating an aircraft in an environment includes computing range measurements and corresponding Doppler measurements based upon radar echo signals that have reflected off a surface of the earth while the aircraft is flying over the surface of the earth. The algorithm also includes selecting a range measurement from the range measurements based upon a Doppler measurement assigned to the range measurement. The algorithm additionally includes computing a multi-dimensional position of the aircraft based upon the range measurement selected from the range measurements. The algorithm further includes controlling a mechanical system of the aircraft based upon the computed multi-dimensional position of the aircraft.

(B2) In some embodiments of the algorithm of (B1), the algorithm additionally includes assigning the range measurement to a Doppler bin based upon the Doppler measurement assigned to the range measurement, where the range measurement is assigned to the Doppler bin prior to the range measurement being selected from the range measurements, where the range measurement is selected from the range measurements based upon the range measurement being a lowest range measurement from amongst range measurements assigned to the Doppler bin.

(B3) In some embodiments of the algorithm of at least one of (B1)-(B2), the range measurements are computed by a range-Doppler radar sensor and the multi-dimensional position of the aircraft is computed by a computing system that is in communication with the range-Doppler radar sensor.

(B4) In some embodiments of the algorithm of at least one of (B1)-(B3), computing the multi-dimensional position of the aircraft based upon the range measurement selected from the range measurements includes identifying a point on a digital terrain map of the surface of the earth based upon the range measurement selected from the range measurements, where the point on the digital terrain map represents a point on the surface of the earth, and further where the multi-dimensional position of the aircraft is computed based upon the point on the digital terrain map.

(B5) In some embodiments of the algorithm of (B4), the algorithm also includes selecting several range measurements from the range measurements based upon Doppler bins assigned to the several range measurements. The algorithm additionally includes identifying points on the digital terrain map of the surface of the earth based upon the several range measurements selected from the range measurements, wherein the points on the digital terrain map represent points on the surface of the earth, and further wherein the multi-dimensional position of the aircraft is computed based upon the points on the digital terrain map.

(B6) In some embodiments of the algorithm of (B5), the several range measurements are selected based upon each range measurement in the several range measurements being assigned to a different Doppler bin.

(B7) In some embodiments of the algorithm of at least one of (B1)-(B6), the multi-dimensional position of the aircraft includes latitude/longitude coordinates of the aircraft.

(B8) In some embodiments of the algorithm of at least one of (B1)-(B7), the algorithm also includes computing a second multi-dimensional position of the aircraft based upon output of an inertial sensor on the aircraft. The algorithm additionally includes comparing the multi-dimensional position of the aircraft with the second multi-dimensional position of the aircraft, where the mechanical system of the aircraft is controlled based upon the comparing of the multi-dimensional position of the aircraft with the second multi-dimensional position of the aircraft.

(C1) In accordance with yet another aspect, an algorithm includes receiving range measurements and Doppler measurements that are assigned to the range measurements, where a range-Doppler radar system onboard an aircraft generates the range measurements and Doppler measurements based upon detected radar echo signals. The algorithm also includes computing a multi-dimensional position of the aircraft based upon the range measurements and Doppler measurements that are assigned to the range measurements.

(C2) In some embodiments of the method of (C1), the algorithm also includes assigning each range measurement in the range measurements to a respective Doppler bin based upon the Doppler measurements that are assigned to the range measurements. The algorithm further includes selecting a range measurement from each Doppler bin, wherein the multi-dimensional position is computed based upon selected range measurements from the Doppler bins.

(C3) In some embodiments of the algorithm of at least one of (C1)-(C2), the method also includes controlling a mechanical system of the aircraft based upon the computed multi-dimensional position.

(D1) In accordance with still yet another aspect, a range-Doppler radar system is coupled to an aircraft, and the range-Doppler radar system includes at least one antenna and processing circuitry that is in communication with the at least one antenna. The processing circuitry is configured to perform at least one method disclosed herein (e.g., any of the methods of (A1)-(A9)).

(E1) In accordance with another aspect, a computing system includes a processor and memory, where the memory stores instructions that, when executed by the processor, cause the processor to perform at least one of the methods disclosed herein (e.g., any of the methods of (A1)-(A9), (B1)-(B8) or (C1)-(C3)).

(F1) In accordance with yet another aspect, a computer-readable storage medium includes instructions that, when executed by a processor, causes the processor to perform at least one of the methods disclosed herein (e.g., any of the methods of (A1)-(A9), (B1)-(B8) or (C1)-(C3)).

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionally described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A system for determining the position and velocity of an object in flight over an environment having a surface having a plurality of known ranges relative to some datum representing the contour of the surface, the system including:

a range-doppler radar system (RDRS) couplable to an object in flight, wherein the RDRS comprises:
an antenna; and
processing circuitry that is in communication with the antenna, wherein the processing circuitry is configured to perform acts comprising:

causing the antenna to emit a plurality of radar signals towards the surface of the environment as the object is flying over the surface of the environment;

receiving a plurality of electrical signals, each that is representative of a radar return detected by the antenna, wherein each radar return is based upon a radar signal reflecting from the surface of the environment;

computing a plurality of range measurements and doppler measurements for a plurality of doppler bins from the plurality of electrical signals;

determining a plurality of minimum range measurements for each of the plurality of doppler bins, the plurality of minimum range measurements forming a minimum range contour (MRC); and transmitting the plurality of plurality of minimum range measurements forming the MRC and corresponding doppler measurements to a computing system; and a computing system that computes the position and velocity of the object based on a received plurality of minimum range measurements forming the MRC and corresponding doppler measurements and the known ranges representing the contour of the surface of the environment controlling a mechanical system of the object in flight based upon the computed position and velocity.

2. The system of claim 1, wherein the computing system that computes the three dimensional (3-D) position and 3-D velocity of the object based on a received plurality of minimum range measurements forming the MRC and corresponding doppler measurements and the known ranges representing the contour of the surface of the environment.

3. The system of claim 1, wherein the computing system that computes the position, the velocity, and attitude of the object based on a received plurality of minimum range measurements forming the MRC and corresponding doppler measurements and the known ranges representing the contour of the surface of the environment.

4. The system of claim 1, wherein the computing system that computes the 3-D position, the 3-D velocity, and the 3-D attitude of the object based on a received plurality of minimum range measurements forming the MRC and corresponding doppler measurements and the known ranges representing the contour of the surface of the environment.

5. The system of claim 2, wherein the RDRS is nadir-pointed.

6. The system of claim 3, the RDRS further including a second antenna, and the processing circuitry in communication with the second antenna and further configured to perform acts of:

receiving a plurality of second electrical signals, each that is representative of a radar return detected by the second antenna, wherein each radar return is based upon a radar signal reflecting from the surface of the environment;

computing a plurality of second range measurements and second doppler measurements for a second plurality of doppler bins from the plurality of electrical signals; and assigning cross-track angle measurements based on the first and second plurality of range measurements.

7. The system of claim 1, wherein the computing system further:

computes an estimate of the plurality of minimum range measurements forming the MRC and the corresponding doppler measurements; and determines a differential between the estimates and the received plurality of minimum range measurements forming the MRC and the corresponding doppler measurements.

8. The system of claim 7, wherein the computing system: computes an estimate of a plurality of minimum range measurements forming the MRC and the corresponding doppler measurements based on one of previously received pluralities of minimum range measurements forming the MRC and the corresponding doppler measurements, outputs of a GPS receiver, and outputs of an inertial sensor system.

9. The system of claim 7, wherein the computing system; computes an estimate of a plurality of minimum range measurements forming the MRC and the corresponding doppler measurements based on previously received pluralities of minimum range measurements forming the MRC and the corresponding doppler measurements and outputs of an inertial sensor system.

10. The system of claim 9, wherein the computing system: computes an estimate of the position and velocity of the object; and computes the position and velocity of the object based on the determined differential and the estimates of the position and velocity.

11. The system of claim 10, wherein the computing system: employs a Kalman filter to process the determined differential; and computes the position and velocity of the object based on the Kalman processed determined differential and the estimates of the position and velocity.

12. The system of claim 10, wherein the computing system: employs an extended Kalman filter to process the determined differential; and computes the position and velocity of the object based on the extended Kalman processed determined differential and the estimates of the position and velocity.

13. The system of claim 10, wherein the computing system computes an estimate of the position and velocity of the object based on the outputs of an inertial sensor system.

14. The system of claim 12, wherein the computing system: computes an estimate of the 3-D position and 3-D velocity of the object; and computes the 3-D position and the 3-D velocity of the object based on the determined differential and the estimates of the 3-D position and 3-D velocity.

15. The system of claim 14, wherein the computing system: employs a Kalman filter to process the determined differential; and computes the 3-D position and 3-D velocity of the object based on the Kalman processed determined differential and the estimates of the 3-D position and 3-D velocity.

16. The system of claim 14, wherein the computing system: employs an extended Kalman filter to process the determined differential; and computes the 3-D position and 3-D velocity of the object based on the extended Kalman processed determined differential and the estimates of the 3-D position and 3-D velocity.

17. The system of claim 12, wherein the computing system: computes an estimate of the position, the velocity, and the attitude of the object; and computes the position, the velocity, and the attitude of the object based on the determined differential and the estimates of the position, the velocity, and the attitude.

18. The system of claim 17, wherein the computing system: employs an extended Kalman filter to process the determined differential; and computes the position, the velocity, and the attitude of the object based on the Kalman processed determined differential and the estimates of the position, the velocity, and the attitude.

19. The system of claim 14, wherein the computing system: computes an estimate of the 3-D position, the 3-D velocity, and the 3-D attitude of the object; and computes the 3-D position, the 3-D velocity, and the 3-D attitude of the object based on the determined differential and the estimates of the 3-D position, the 3-D velocity, and the 3-D attitude.

20. The system of claim 19, wherein the computing system; employs an extended Kalman filter to process the determined differential; and computes the 3-D position, the 3-D velocity, and the 3-D attitude of the object based on the Kalman processed determined differential and the estimates of the 3-D position, the 3-D velocity, and the 3-D attitude.

* * * * *